United States Patent
MacKnight

(10) Patent No.: US 6,956,862 B2
(45) Date of Patent: Oct. 18, 2005

(54) METHOD AND APPARATUS TO COMBINE HETEROGENEOUS HARDWARE INTERFACES FOR NEXT GENERATION PACKET VOICE MODULE DEVICES

(75) Inventor: James MacKnight, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 10/725,691

(22) Filed: Dec. 2, 2003

(65) Prior Publication Data

US 2005/0117565 A1 Jun. 2, 2005

(51) Int. Cl.[7] .............................................. H04L 12/56
(52) U.S. Cl. ...................................... 370/419; 370/359
(58) Field of Search ................................ 370/257–258, 370/352–359, 419–421, 465–467, 469; 710/48–50, 63–65, 68, 71, 300–302, 305–315

(56) References Cited

U.S. PATENT DOCUMENTS 5,349,579 A * 9/1994 Madonna et al. ........... 370/259
6,535,505 B1 * 3/2003 Hwang et al. .............. 370/352
6,839,792 B2 * 1/2005 Feldstein et al. ........... 710/306

OTHER PUBLICATIONS

MOTOROLA, MSC8101 User's Guide, MSC8101UG/D Rev. 2, Mar. 2004, pp. 4–14 through 4–18, copyright Motorola, Inc. 2001, 2004; retrieved from the Internet: <http://e-www.motorola.com/files/dsp/doc/user_guide/MSC8101UG.pdf>.

Shurtz, Greg, Using the TMS320VC5509/5510 Enhanced HPI, Texas Instruments Application Report SPRA741—Apr. 2001, 22 pages, copyright 2001 Texas Instruments Inc.; retrieved from the Internet: <http://focus.ti.com/lit/an/spra741/spra741.pdf>.

* cited by examiner

*Primary Examiner*—Chi Pham
*Assistant Examiner*—Thai Hoang
(74) *Attorney, Agent, or Firm*—Charles E. Krueger

(57) ABSTRACT

A Packet Voice Data Module (PVDM)/Host Platform Interface that supports multiple vendor's DSPs without sacrificing performance. The interface also provides a hardware chip select for selecting non-DSP functionality to expand the use of the interface. Testing and module identification functions are also enabled by the interface.

19 Claims, 3 Drawing Sheets

METHOD AND APPARATUS TO COMBINE HETEROGENEOUS HARDWARE INTERFACES FOR NEXT GENERATION PACKET VOICE MODULE DEVICES

BACKGROUND OF THE INVENTION

Many routing platforms and other network devices utilize a Packet Voice Data Module (PVDM) to perform function related to processing telephony, voice, fax, and other types of data for utilization in networks that implement types of Voice and Fax over Internet Protocol (V/FoIP) and other protocols. The PVDM utilizes one or more Digital Signal Processors (DSPs) which are specialized integrated circuits that perform signal processing operations at high speed.

The legacy PVDM/Host Platform Interface is physically realized as a PVDM slot in the motherboard and utilizes, for example, a 72 pin SIMM connector. FIG. 1 is a high-level block diagram depicting the PVDM/Host Platform Interface. Digital data to be processed by the PVDM is received over the TDM (time division multiplexed) buses 12 and processed data is output over the parallel bus 14.

Incompatibility between different vendor's Digital Signal Processor (DSP) high speed parallel communications host port interfaces has previously required that the legacy PVDM interface be designed for only a single vendor's DSPs. Since different vendor's DSP products meet various segments of the market space and only allow the PVDM interface to operate with a small subset of a single vendor's product line, the legacy interface limits the operational and cost effectiveness of the PVDM solution over, for example, the Access Router market space.

This legacy, single vendor PVDM hardware bus definition and functionality are presently used in most access routers to provide analog signal processing for voice, data and modem analog signals from Wide Area Network (WAN) interface ports.

Accordingly, an improved PVDM interface is required to provide maximum flexibility with respect to performance and market segment matching. Additionally, a flexible interface would also be advantageous to allow modules plugged into the PVDM interface to perform additional add-on specific processing such as echo cancellation, video processing, etc.

BRIEF SUMMARY OF THE INVENTION

In one embodiment of the invention, a multi-vendor DSP solution at the PVDM hardware interface level supports optimized hardware bus operation for each DSP vendor.

In another embodiment of the invention, a parallel bus may be configured to implement different parallel bus protocols. The particular parallel bus protocol implemented is determined by reading identification information stored on the PVDM.

In another embodiment of the invention, digital signature information is stored on the module which is utilized to unambiguously identify the module.

In another embodiment of the invention, a PVDM interface provides the functions of external testability, expandability, unique identification, generic add-on application-specific processing and future-proofing of a next generation PVDM devices.

In another embodiment of the invention, a hardware chip select included in the interface enables direct communication between the host platform and any add-on functionality or on-board non-DSP device to expand the functionality provided by the interface.

In another embodiment of the invention, selected pins are redefined to allow full DMA functionality.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
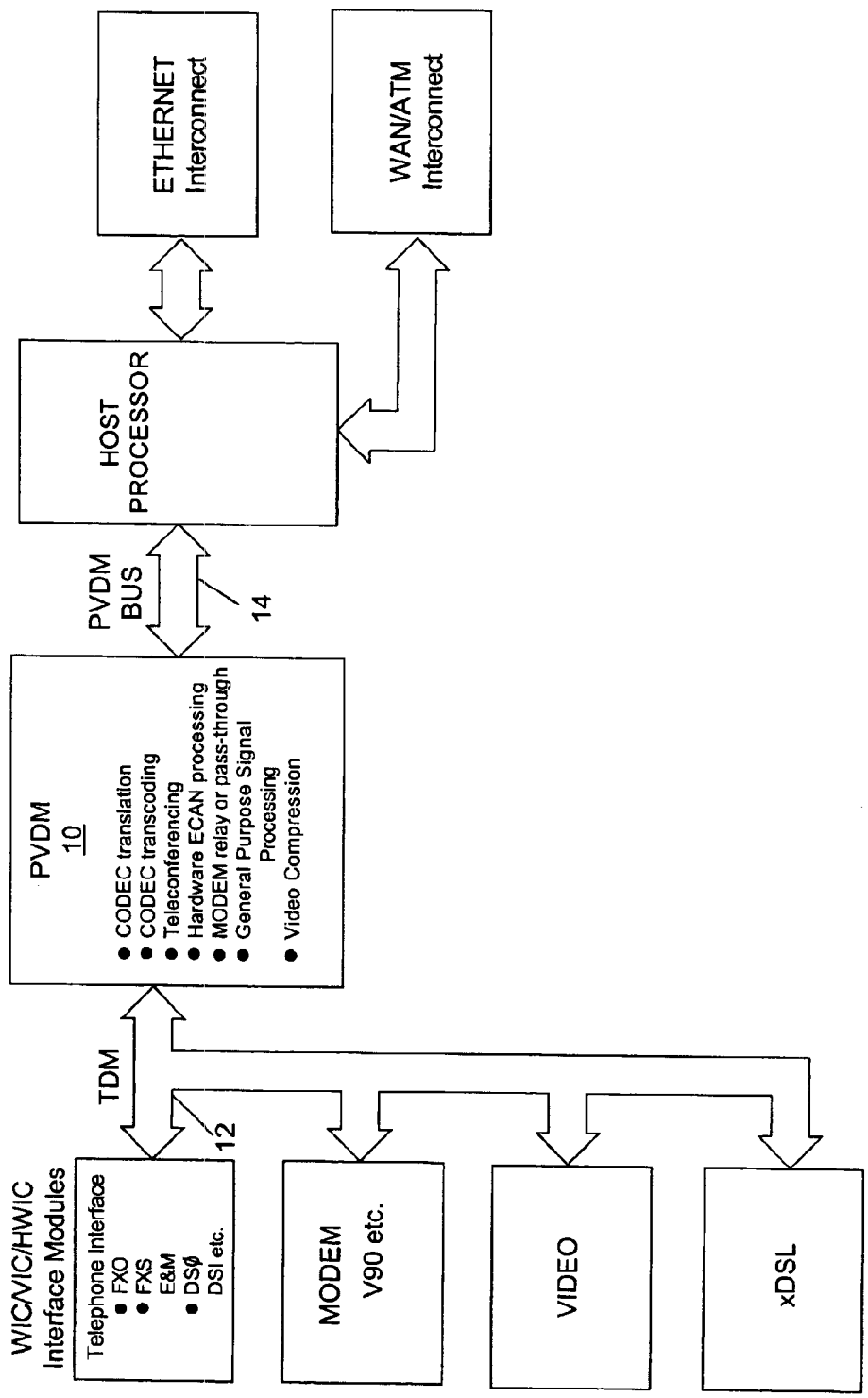
FIG. 1 is a high-level block diagram of a generic legacy PVDM interface.
Figure 2:
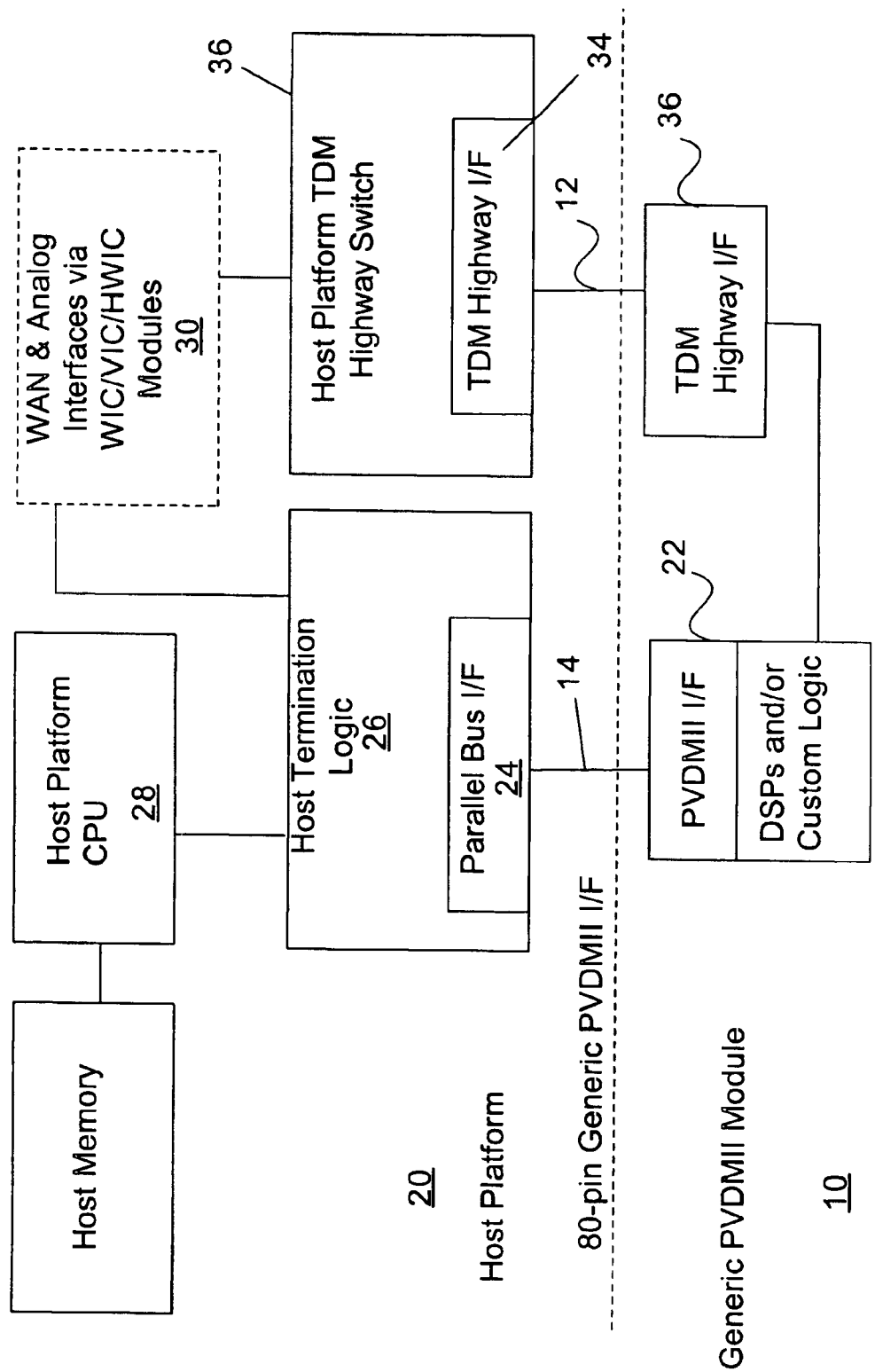
FIG. 2 is a block diagram of an embodiment of a PVDM/Host Platform interface.

FIG. 2 is a block diagram of an embodiment the PVDM interface of the present invention. In FIG. 2 an 80-pin connector is utilized to physically connect the PVDM 10 to the host platform 20. Voice and data packets either sourced or destined to the access router's local WAN and/or analog port terminations are passed to the PVDM module via the 16-bit bi-directional Parallel Bus 14. This bus is also used to for control plane communications between the Host processor and PVDM module. On the PVDM side the parallel bus is terminated by a PVDM parallel interface 22. On the Host Platform side the parallel bus is terminated by a Host Parallel Bus Interface 24 which is part of the Host Termination Logic 26. The Host Termination Logic 26 couples the PVDM with other devices on the Host Platform such as the Host CPU 28 and the WAN (Wide Area Network) and Analog Interfaces 30.

Further, four TDM Highway buses are terminated on the Host Platform side by a Host Platform TDM Highway Interface 34 which is part of a Host Platform TDM Highway Switch 36 and on the PVDM side by a PVDM TDM Highway Interface 36.

Thus, in this embodiment, the 80-pin PVDM interface consists of seven data busses plus system control and interface signaling. These are:
1. A single 16-bit parallel bus interface including addressing, handshake and interrupt logic
2. Four independent TDM Highway busses with optional bi-directional Clock and Frame sync capability
3. A JTAG (Joint Test Access Group) Test and Emulation serial bus. The JTAG emulation bus is accessible via both the 80-pin edge connector and a separate, on-board connection.

4. A Cookie SPI Serial EEPROM bus used for identification, configuration and digital signature functions for the PVDM module.
5. System level signals, including reset, and the PVDM module generic Chip Select capability.
6. Single voltage input power plus common power and signal ground connection.

Each of these components will be described in more detail below.

The above-described interface provides for expanded PVDM module functions that could be performed including: a hardware ECAN (echo cancellation) module; a DSP farm for hardware assisted teleconferencing, transcoding, etc.; and, multiple clock domain support for handling heterogeneous WAN and Internet provider voice and packet services, etc.

Figure 3:
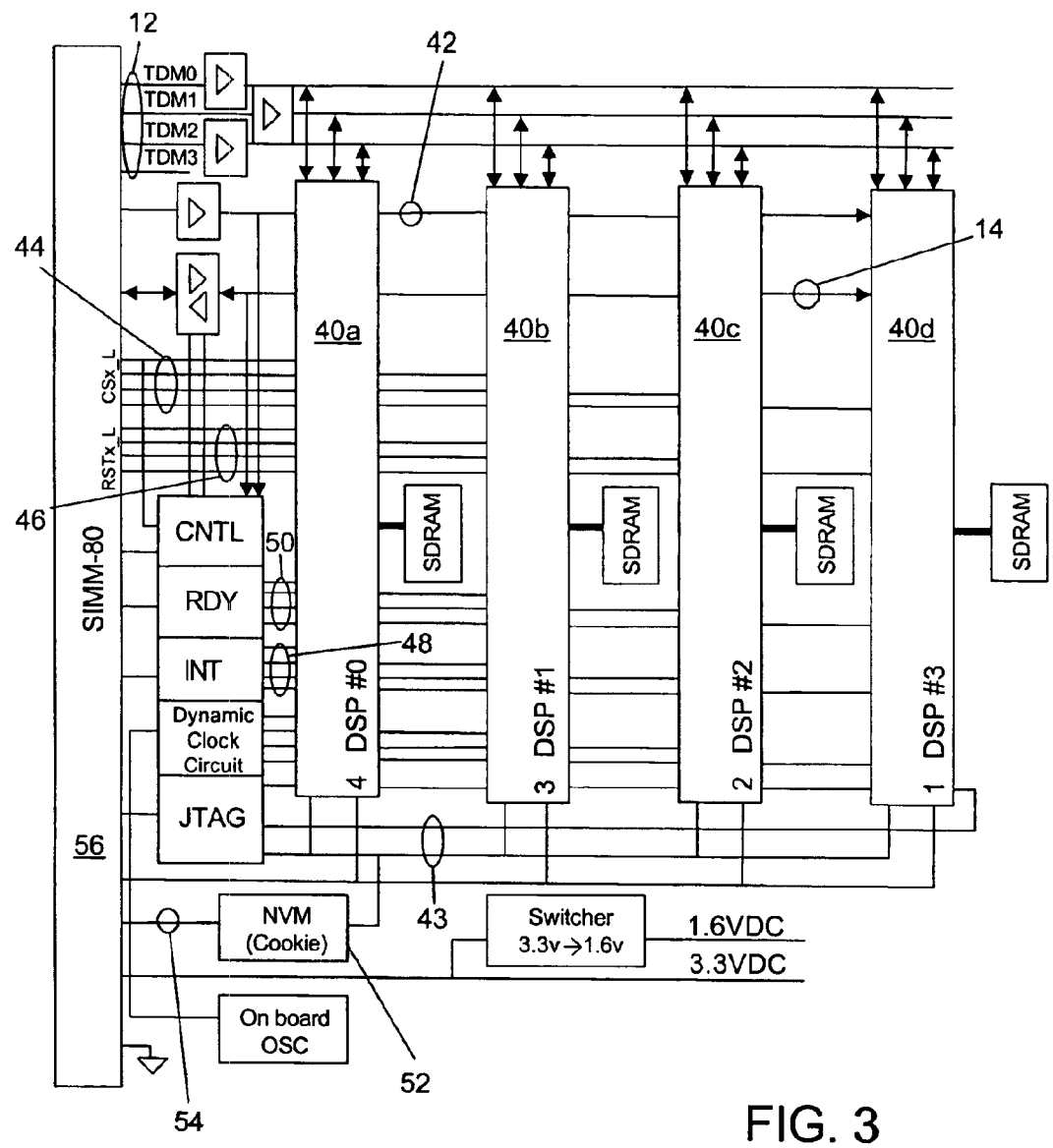
FIG. 3 is a schematic diagram of a PVDM utilizing an embodiment of the PVDM/Host Interface.

FIG. 3 is a block diagram of a DSP-centric PVDM configured to interface with PVDM Interface of the presently described embodiment. The DSPs 40a–d are coupled to the four TDM highways 12, a dedicated unidirectional address bus 42, a JTAG bus 43, the bi-directional parallel bus 14, and respective chip select, reset lines, interrupt and ready lines 44, 46, 48 and 50. Additionally a non-volatile memory element 52, in this embodiment an EEPROM, functions as a cookie to hold module identification, configuration and signature information describing the PVDM and is coupled to the SPI serial bus 54.

As depicted in FIG. 3, all of the lines are terminated in the SIMM-80 connector 56 which is used to connect the PVDM to the motherboard.

Integrated Cookie Serial Bus

In this embodiment, a Cookie SPI bus interface is implemented using a 93C46 Serial EEPROM, or equivalent. Manufacturing, technical support and the Host processor all use the Cookie Serial EEPROM stored data. Manufacturing uses it for tracking, serial numbers and part numbers, among other items. The Host processor uses the cookie EEPROM to identify manufacturing/technical support required data, define configuration parameters and capabilities within the PVDM module, and to provide a unique, unambiguous signature for PVDM module type identification to be used by the Host processor.

In this embodiment, all host processor implementations of the Cookie Serial EEPROM interface must support the lowest cookie speed of 100 Kbps.

PVDM Interface Generic Parallel Bus

This generic parallel, 16-bit wide data path communications bus has been defined to allow a number of major DSP vendor's parallel interfaces to be used. In the presently described interface, two DSP vendor's parallel interfaces are hardware compatible with this defined interface: Texas Instrument's® EHPI 16-bit parallel bus, and Motorola's® HDI16 parallel bus. In this embodiment the timing requirements of the EHPI bus are modified to form a superset to accommodate the HDI16 bus.

Other DSPs may be interfaced to this parallel bus and the specific PVDM module hardware will ensure hardware interface compatibility with this PVDM Interface Generic Parallel Bus.

In this embodiment, this 16-bit parallel interface is bussed to all on-board DSPs, using a DSP-unique Chip Select, CSx, to activate the correct DSP for data transfer. This parallel bus is implemented as a Slave bus protocol, with the Host platform initiating all transfers. The bus has no parity or CRC hardware data integrity checking. The PVDM Inter face parallel bus of this embodiment has the following capabilities:
16-bit wide data path which can also be used as a multiplexed data/address bus if so implemented
4-bit wide address bus to access internal DSP registers
Parallel bus control signals to perform read, write, optional data/address bus multiplexing, data strobe, Host/DSP handshake, DSP chip select and interrupt functions.
Two configurable Host processor DMA request signals to support either combined (single signal) or independent (two signal) transmit and/or receive DMA channels.
Byte wide Parallel Bus accesses may optionally be implemented using the two defined Byte Enable pins.

In this embodiment, the parallel bus is compatible with both the Texas Instruments® Enhanced Host-Port Interface (EHPI) bus and the Motorola® High Density Interface, 16-bit (HDI16). Changes were made to accommodate both Parallel bus capabilities as part of the PVDM 16-bit bi-directional Parallel Bus.

Also, in this embodiment the timing and switching requirements of the PVDM Interface parallel bus are based on the EHPI bus but have been modified to form a superset to accommodate the HDI16 bus timing and switching requirement. On startup, the host processor 28 reads the on-board cookie EEPROM on the PVDM to determine which vendor's DSPs are present on the board. The host then configures the Host termination logic 26 to utilize the bus protocol that is compatible with the on-board DSPs.

For example, in this embodiment the HRDY-HTRQ (HostReaDY-HosTReQuest) output PVDM Interface signal changes function dependent on which vendor DSP is enabled via the on board cookie EEPROM. Specifically, the HRDY functionality (both receive and transmit DMA throttling control) is used with the EHPI-based on-board DSPs and the HTRQ functionality (independent transmit DMA control) is used with HDI16 -based on board DSPs. In similar fashion, the HRRQ (HostReadyReadreQuest) output PVDM Interface signal function is enabled or unused dependent on the cookie EEPROM contents. The HRRQ function is used with HDI16-based DSPs requiring an independent receive DMA throttling control and must be used in conjunction with the HTRQ function.

In this embodiment, connector pin out constraint requires all devices located on a single PVDM module to be connected in parallel on the internal 16-bit Parallel Bus. Additional tradeoffs are made to conserve edge connector pin usage. One example is by implementing a common interrupt line back to the Host processor, requiring the Host processor to poll the PVDM module or specific DSPs to determine which Parallel Bus processing element has created the interrupt.

Independent Chip Selects for each DSP are used for determining which local processing element is to respond on the Parallel Bus. DSP addressing functionality may be implemented using the 4 bits of Address bus or by multiplexing both address and data information onto the 16-bit bi-directional Parallel Bus. The use the 4 separate address lines for addressing and register functions plus using the multiplexed address/data mode as this is compatible with existing implementations.

The general architecture of the software interface via the 16-bit Parallel bus is very similar to the existing PVDM modules, i.e. it is a Slave interface with separate Chip Selects and interrupt capability.

TDM Highway

In this embodiment, there are four, independent TDM data streams defined. Each TDM highway is presently defined to implement 128 time slots at an 8.192 MHz bit rate, assuming an 8 KHz Frame Sync. By design, all PVDM module hardware layouts must be capable of supporting up to a 16 MHz clock frequency, including SI (signal integrity) compatibility analysis. Software support for a 16 MHz TDM clock rate is optional. Hardware support for 16 MHz TDM clock operation is optional for Host Platforms.

The PVDM TDM bus Clock and Frame Sync lines may optionally be bi-directional but are normally implemented as inputs to DSP-centric PVDM modules from the host platform. In this embodiment, it is required that the Host platform treat these lines as if they may be bi-directional to/from the PVDM modules, however, it is not required for the PVDM module implementations to be bi-directional.

Both the TDM Frame Sync and Clock signals may source or sink, allowing new dimensions in TDM bus interfacing, such as multiple clock domain support or termination of L2 functionality out on the PVDM module.

JTAG Test & Emulation Bus

In this embodiment, all DSPs on the PVDM have their JTAG ports daisy chained. Debug may be accomplished either via a debug header on the PVDM module or through the 80-pin SIMM connector onto the Host platform. These two access points to the JTAG bus are not required be used simultaneously.

Debug headers may be the standard 14-pin 0.100" 2×7 header, a custom 2×7 edge connector or any other custom connection method deemed suitable for the Host platform team debug.

Hardware Chip Select

In this embodiment, a unique hardware chip select included in the PVDM interface allows the host platform direct communications to any special functionality or on-board programmable device on the PVDM without disturbing the operation of other DSP select lines and the PVDM module's standard functionality. This allows the bus of the PVDM interface to simultaneously support different, non-DSP uses on a single Generic PVDM without compromising the bus's existing DSP operational function requirements.

On example of extra functionality is the use of a programmable on-module chip to dynamically adjust the slew rates of the DSP clock timing signals.

DMA

The PVDM interface of the presently described embodiment implements the legacy PVDM asynchronous, unidirectional, single channel Direct Memory Access (DMA) transfers, and also implements new asynchronous, bi-directional, dual channel DMA transfers using an additional DMA control line.

Along with the standard, unidirectional DMA channel interface hardware output control line, an additional hardware-defined DMA channel output control line is defined to allow simultaneous read and write DMA operations using the same bus. This additional DMA channel control line allows optimization of the DMA interface for more intelligent DMA data transfers over the existing legacy PVDM bus definition.

A new, dual DMA addressing mechanism allows use of either embedded, auto-increment address/data frame communication structures or separate address lines for external, directly addressed address register auto-incrementing implementations.

The various features of the invention may be implemented as hardware or as program code, stored on a computer readable medium, that is executed by a digital computer. The computer readable medium may include, among other things, magnetic media, optical media, electromagnetic fields encoding digital information, and so on.

The invention has now been described with reference to the preferred embodiments. For example, in the above description redefinition of signal pin functions to accommodate either the EHPI or HDI16 bus are described. The modification of signal lines to accommodate other vendors protocols can similarly be implemented as is known by persons of skill in the art. Alternatives and substitutions will now be apparent to persons of skill in the art. Accordingly, it is not intended to limit the invention except as provided by the appended claims.

What is claimed is:

1. A host platform/PVDM (packet voice data module) interface where the packet module includes at least one on-board DSP compatible with one particular host parallel bus protocol of a set of parallel bus protocols, said interface comprising:

a parallel bus coupled to the host ports of the DSP;

a non-volatile memory holding information indicating which one of the parallel bus protocols is utilized by the on-board DSP;

a serial bus coupled to the non-volatile memory for reading the information held on the non-volatile memory; and termination logic, capable of implementing each protocol in the set of parallel bus protocols, for reading the information from the non-volatile memory and implementing the parallel bus protocol, identified by the non-volatile memory, utilized by the on-board DSP.

2. The interface of claim 1 further comprising:

a test and emulation bus for allowing diagnostic testing of on-board components.

3. The interface of claim 2 further comprising:

multiple time-division multiplexed buses coupled to the on-board DSP.

4. The interface of claim 1 where the PVDM includes a plurality of on-board DSPs, the interface further comprising:

a like plurality of DSP chip selects for selecting a particular one of the plurality of on-board DSPs to respond to the parallel bus; and a hardware chip select for communication with a device on board the PVDM that provides special functionality.

5. The interface of claim 1 with said non-volatile memory further holding digital signature information utilized by the host for unambiguous module identification.

6. A method for interfacing a host platform and a PVDM (packet voice data module), where the packet module includes at least one on-board DSP (digital signal processor), which is compatible with one particular host parallel bus protocol out of a set of parallel bus protocols that can be implemented by host platform, and where the PVDM includes a non-volatile memory holding identification information identifying the type of on-board DSP, said method, with a configurable parallel bus and serial bus coupling the host platform and PVDM, said method, performed by host processor on the host platform, comprising the steps of:

reading the non-volatile memory over the serial bus to access the identification information to identify a particular parallel bus protocol, out of the set of parallel bus protocols, that is compatible with the on-board DSP; and configuring the parallel bus to implement the particular parallel bus protocol to communicate with the on-board DSP.

7. The method of claim 6, where the non-volatile memory holds digital signature information, and further comprising the step of:

reading the digital signature information; and unambiguously identifying the PVDM based on the digital signature information.

8. The method of claim 6 where a dedicated hardware chip select line couples the host platform to the PVDM and where the PVDM includes a non-DSP module, said method further comprising the step of:

utilizing the hardware chip select line to select the non-DSP module without disturbing DSP chip selecting functionality.

9. The method of claim 6 where said step of configuring the parallel bus further comprises the steps of:

selecting the function of a particular DMA control line of the bus to be compatible with the DMA operation of an identified on-board DSP.

10. A system for interfacing a host platform and a PVDM (packet voice data module), where the packet module includes at least one on-board DSP (digital signal processor), which is compatible with one particular host parallel bus protocol out of a set of parallel bus protocols that can be implemented by host platform, and where the PVDM includes a non-volatile memory holding identification information identifying the type of on-board DSP, with a configurable parallel bus and serial bus coupling the host platform and PVDM, said system comprising:

means for reading the non-volatile memory over the serial bus to access the identification information to identify a particular parallel bus protocol, out of the set of parallel bus protocols, that is compatible with the on-board DSP; and means for configuring the parallel bus to implement the particular parallel bus protocol to communicate with the on-board DSP.

11. The system of claim 10, where the non-volatile memory holds digital signature information, and further comprising:

means for reading the digital signature information; and means for unambiguously identifying the PVDM based on the digital signature information.

12. The system of claim 10 where a dedicated hardware chip select line couples the host platform to the PVDM and where the PVDM includes a non-DSP module, said system further comprising:

means for utilizing the hardware chip select line to select the non-DSP module without disturbing DSP chip selecting functionality.

13. The system of claim 10 where said means for configuring the parallel bus further comprises:

means for selecting the function of a particular DMA control line of the bus to be compatible with the DMA operation of an identified on-board DSP.

14. A computer program product, executed by a host processor, for interfacing a host platform and a PVDM (packet voice data module), where the packet module includes at least one on-board DSP (digital signal processor), which is compatible with one particular host parallel bus protocol out of a set of parallel bus protocols that can be implemented by host platform, and where the PVDM includes a non-volatile memory holding identification information identifying the type of on-board DSP, with a configurable parallel bus and serial bus coupling the host platform and PVDM, said computer program product comprising:

a computer usable medium having computer readable program code physically embodied therein, said computer program product further comprising:

computer readable program code executed by the host processor for reading the non-volatile memory over the serial bus to access the identification information to identify a particular parallel bus protocol, out of the set of parallel bus protocols, that is compatible with the on-board DSP; and computer readable program code executed by the host processor for configuring the parallel bus to implement the particular parallel bus protocol to communicate with the on-board DSP.

15. The computer program product of claim 14, where the non-volatile memory holds digital signature information, and further comprising:

computer readable program code executed by the host processor for reading the digital signature information; and computer readable program code executed by the host processor for unambiguously identifying the PVDM based on the digital signature information.

16. The computer program product of claim 14 where a dedicated hardware chip select line couples the host platform to the PVDM and where the PVDM includes a non-DSP module, said system further comprising:

computer readable program code executed by the host processor for utilizing the hardware chip select line to select the non-DSP module without disturbing DSP chip selecting functionality.

17. The computer program product of claim 14 where said means for configuring the parallel bus further comprises:

computer readable program code executed by the host processor for selecting the function of a particular DMA control line of the bus to be compatible with the DMA operation of an identified on-board DSP.

18. A PVDM (packet voice data module) to be coupled to a slot on a motherboard, where the PVDM includes at least one on-board DSP compatible with one particular host parallel bus protocol of a set of parallel bus protocols, said PVDM comprising:

a parallel bus interface coupled to the host ports of the DSP, with the parallel bus interface adapted to be coupled to a parallel bus on the motherboard;

a non-volatile memory holding information indicating which one of the parallel bus protocols is utilized by the on-board DSP;

a serial bus interface coupled to the non-volatile memory to allow a processor on the motherboard to read the information held on the non-volatile memory so that termination logic on the motherboard, capable of implementing each protocol in the set of parallel bus protocols, can read the information from the non-volatile memory and implement the parallel bus protocol, identified by the non-volatile memory, utilized by the on-board DSP.

19. A host platform having a motherboard including a processor and a slot for accepting a PVDM (packet voice data module) to be coupled to a slot on a motherboard, where the PVDM includes at least one on-board DSP compatible with one particular host parallel bus protocol of a set of parallel bus protocols and also includes a non-volatile memory holding information indicating which one of the parallel bus protocols is utilized by the on-board DSP, said host platform comprising:

a parallel bus coupled to the host ports of the DSP, with the parallel bus interface adapted to be coupled to a parallel bus on the motherboard;

a serial bus interface adapted to be coupled to the non-volatile memory on the PVDM to allow the processor on the motherboard to read the information held on the non-volatile memory so that termination logic on the motherboard, capable of implementing each protocol in the set of parallel bus protocols, can read the information from the non-volatile memory and implement the parallel bus protocol, identified by the non-volatile memory, utilized by the on-board DSP.

* * * * *